United States Patent

Ota

[11] Patent Number: 5,857,587
[45] Date of Patent: Jan. 12, 1999

[54] AUTOMATIC FASTENER SUPPLIER

[76] Inventor: Yoshitake Ota, 1-1 Tamura-Chou, Ichinoseki City Iwate-Prf, Japan

[21] Appl. No.: 721,946

[22] Filed: Sep. 27, 1996

[51] Int. Cl.$^6$ .............................. B65H 3/00; B65H 31/20; G07F 11/16

[52] U.S. Cl. ...................... 221/242; 221/162; 221/241; 221/254; 221/268; 221/251; 227/109; 227/135

[58] Field of Search ........................... 221/158, 159, 221/160, 162, 236, 239, 241, 242, 251, 254, 268, 193; 227/109, 119, 135, 120, 131, 137; 81/432, 433, 57.37

[56] References Cited

U.S. PATENT DOCUMENTS

| | | | |
|---|---|---|---|
| 884,211 | 4/1908 | Rodd | 221/180 |
| 1,000,998 | 8/1911 | Cuff | 221/251 |
| 1,803,993 | 5/1931 | Brennan | 221/162 |
| 1,818,051 | 8/1931 | Duplessis | 221/251 |
| 2,785,400 | 3/1957 | McIlvin et al. | 221/251 |
| 2,879,509 | 3/1959 | Congdon et al. | 227/109 |
| 2,931,537 | 4/1960 | Carpenter | 221/251 |
| 3,246,799 | 4/1966 | Davis | 221/251 |
| 3,269,594 | 8/1966 | MacKenzie et al. | 221/168 |
| 3,741,367 | 6/1973 | Castiglioni | 198/389 |
| 3,779,422 | 12/1973 | Mori et al. | 221/160 |
| 4,148,389 | 4/1979 | Dixon | 221/160 |
| 4,208,153 | 6/1980 | Trethewy | 221/124 |
| 4,620,656 | 11/1986 | McClay et al. | 221/64 |
| 4,748,877 | 6/1988 | Watanabe | 221/168 |
| 4,751,863 | 6/1988 | Watanabe | 81/433 |
| 5,014,876 | 5/1991 | Young et al. | 221/268 |
| 5,392,954 | 2/1995 | Gartz | 221/162 |
| 5,480,087 | 1/1996 | Young et al. | 221/268 |
| 5,702,030 | 12/1997 | Hulscher | 221/251 |

FOREIGN PATENT DOCUMENTS

| | | |
|---|---|---|
| 719923 | 12/1954 | United Kingdom .................... 221/168 |
| 1347862 | 2/1974 | United Kingdom . |
| 2187443 | 9/1987 | United Kingdom . |

*Primary Examiner*—Karen M. Young
*Assistant Examiner*—Thuy V. Tran
*Attorney, Agent, or Firm*—Rosenberg, Klein & Bilker

[57] ABSTRACT

An automatic fastener supplier includes a frame having a receiving section for receiving fasteners. A track is removably and partially mounted in the receiving section. The track includes a gap defined therein for receiving shanks of the fasteners and an upper open edge for retaining heads of the fasteners. A fastener feeding device is mounted in the receiving section and is vertically movable for feeding fasteners in the receiving section onto the track. A main driving device is provided for driving the fastener feeding device to move vertically. A stop is mounted to the front end of the track for preventing further forward movement of the fastener. A track supporting device has a supporting member for supporting the track yet allowing insertion and removal of the track. A position deciding device is mounted to the supporting member for adjusting a longitudinal position of the track.

17 Claims, 17 Drawing Sheets

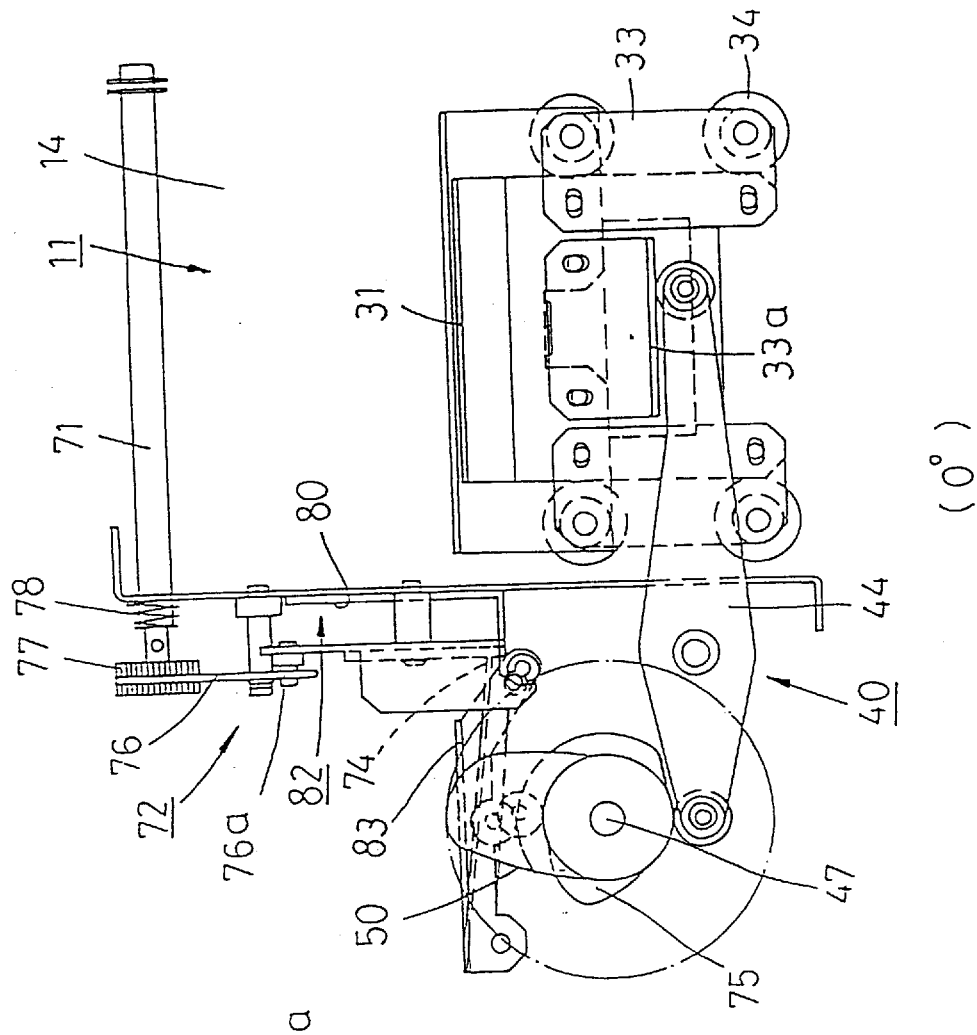
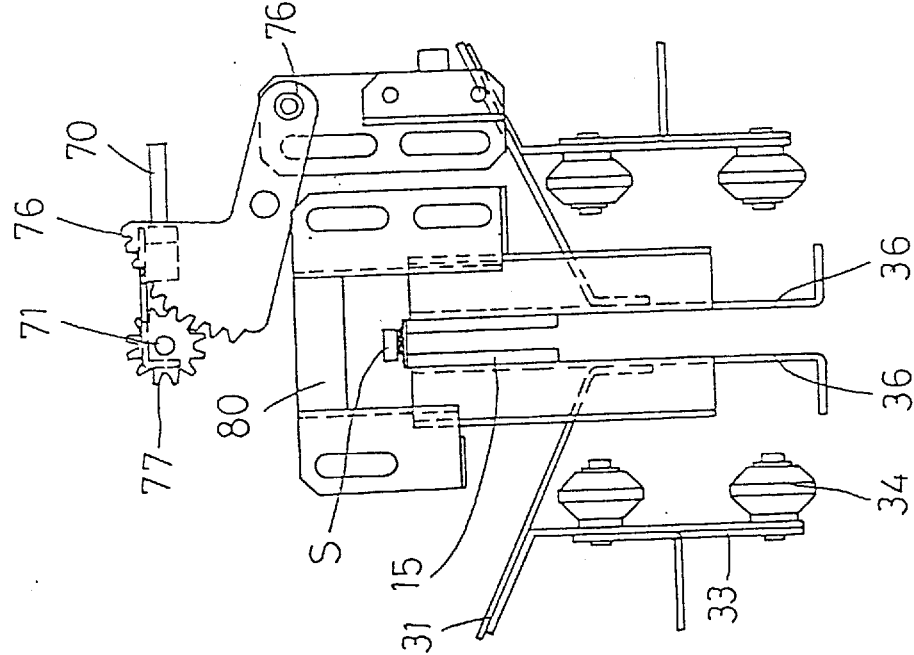
FIG.11b (0°)
FIG.11a (0°)

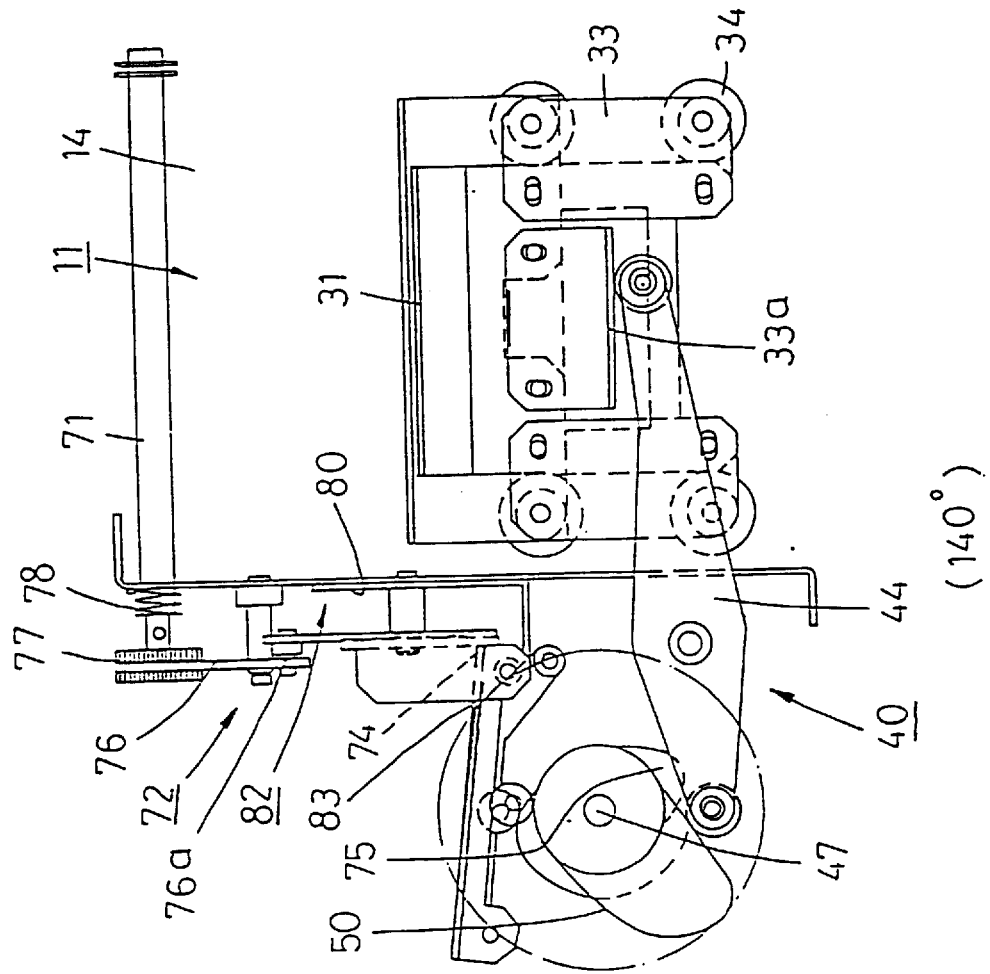
FIG.12b (140°)
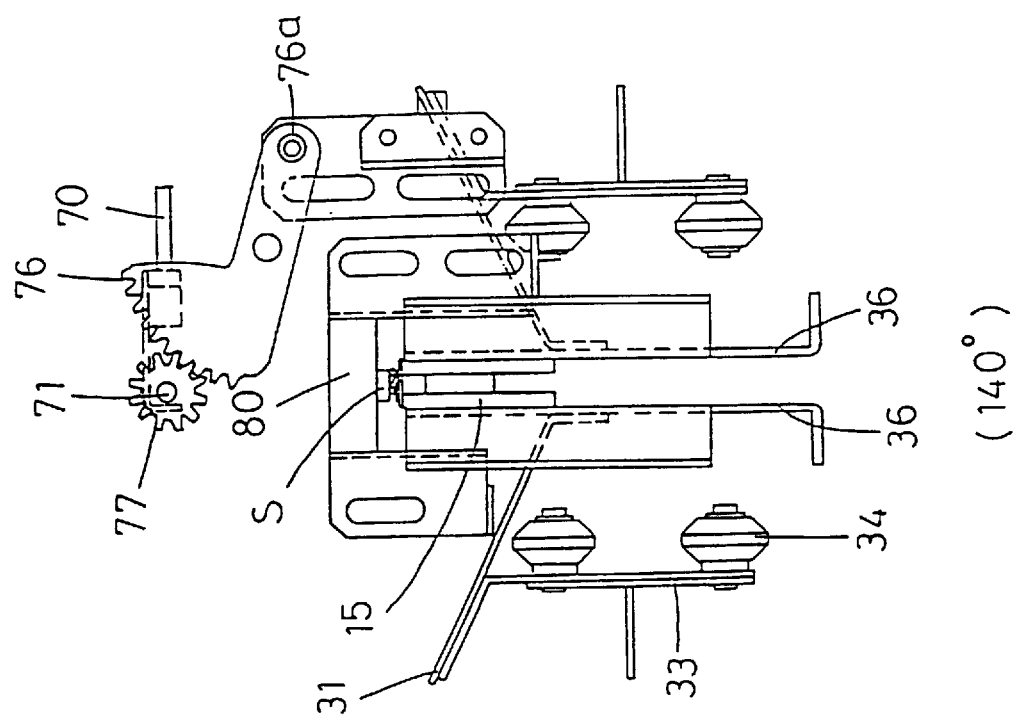
FIG.12a (140°)

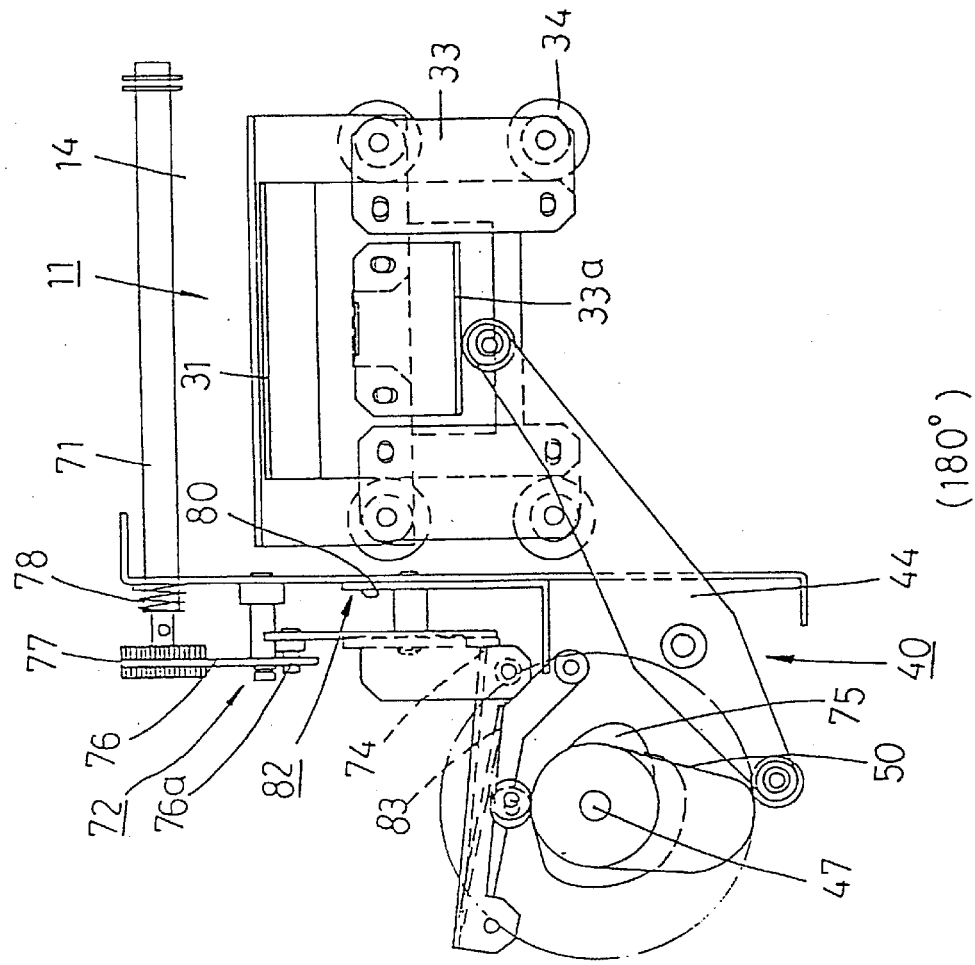
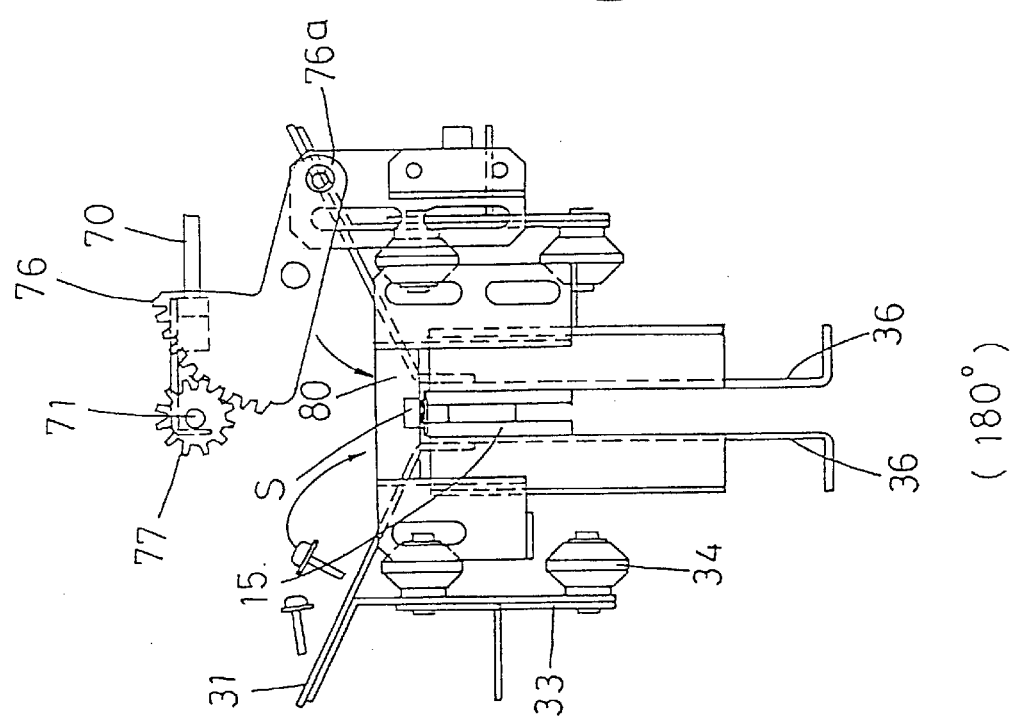
FIG.13b (180°)
FIG.13a (180°)

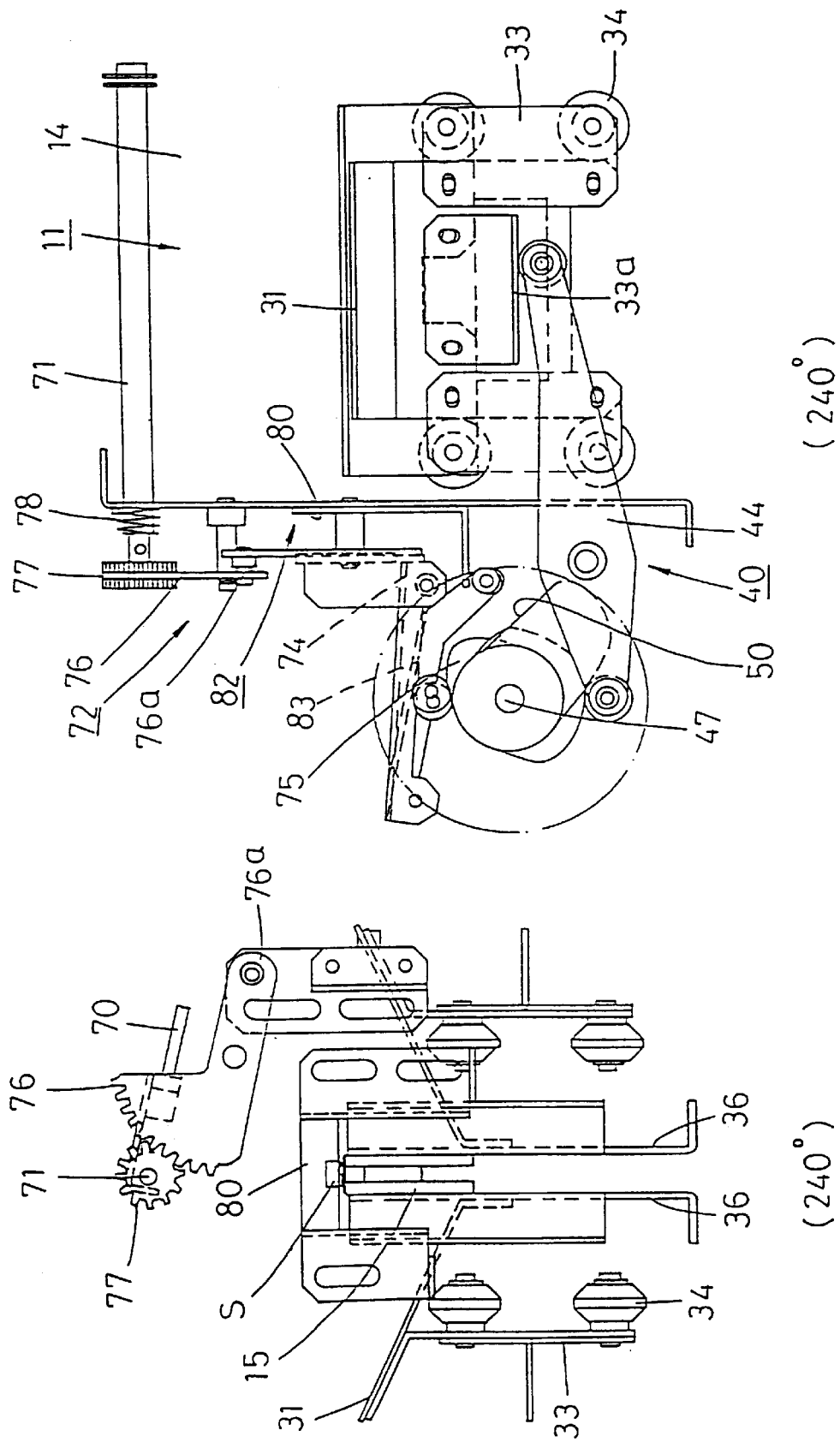

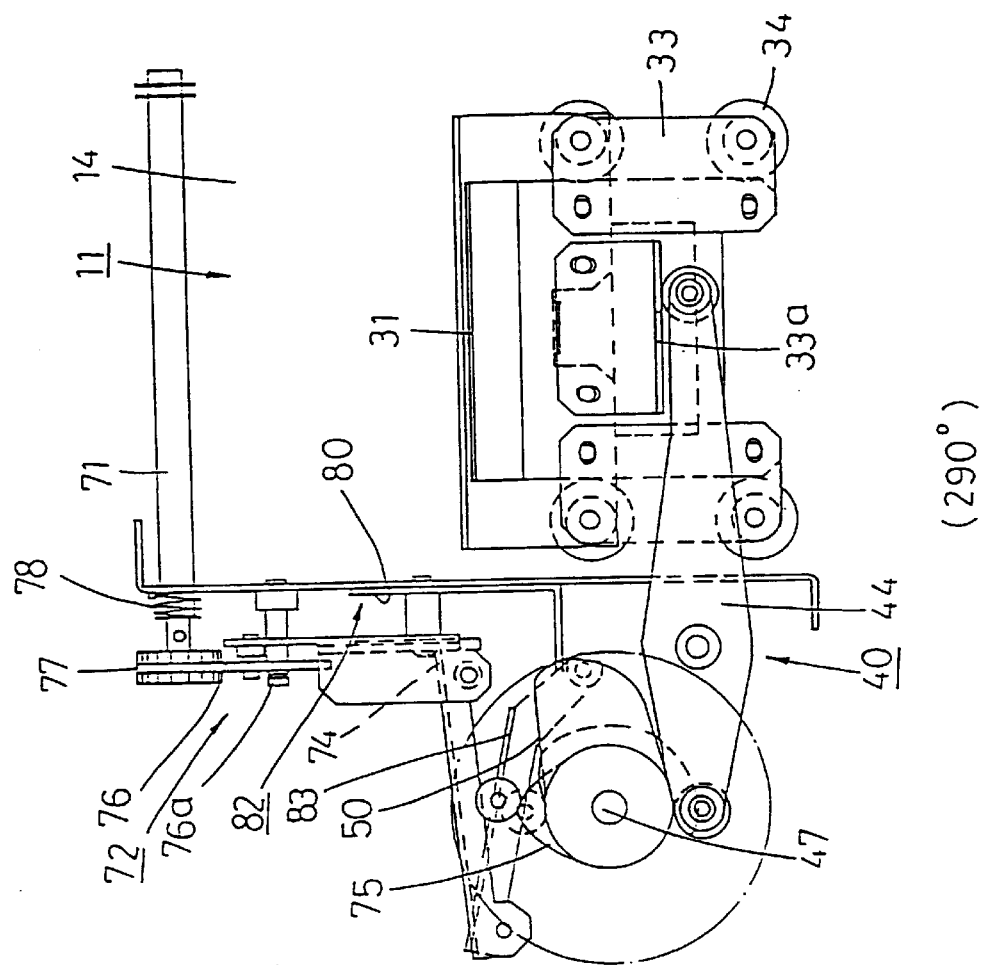

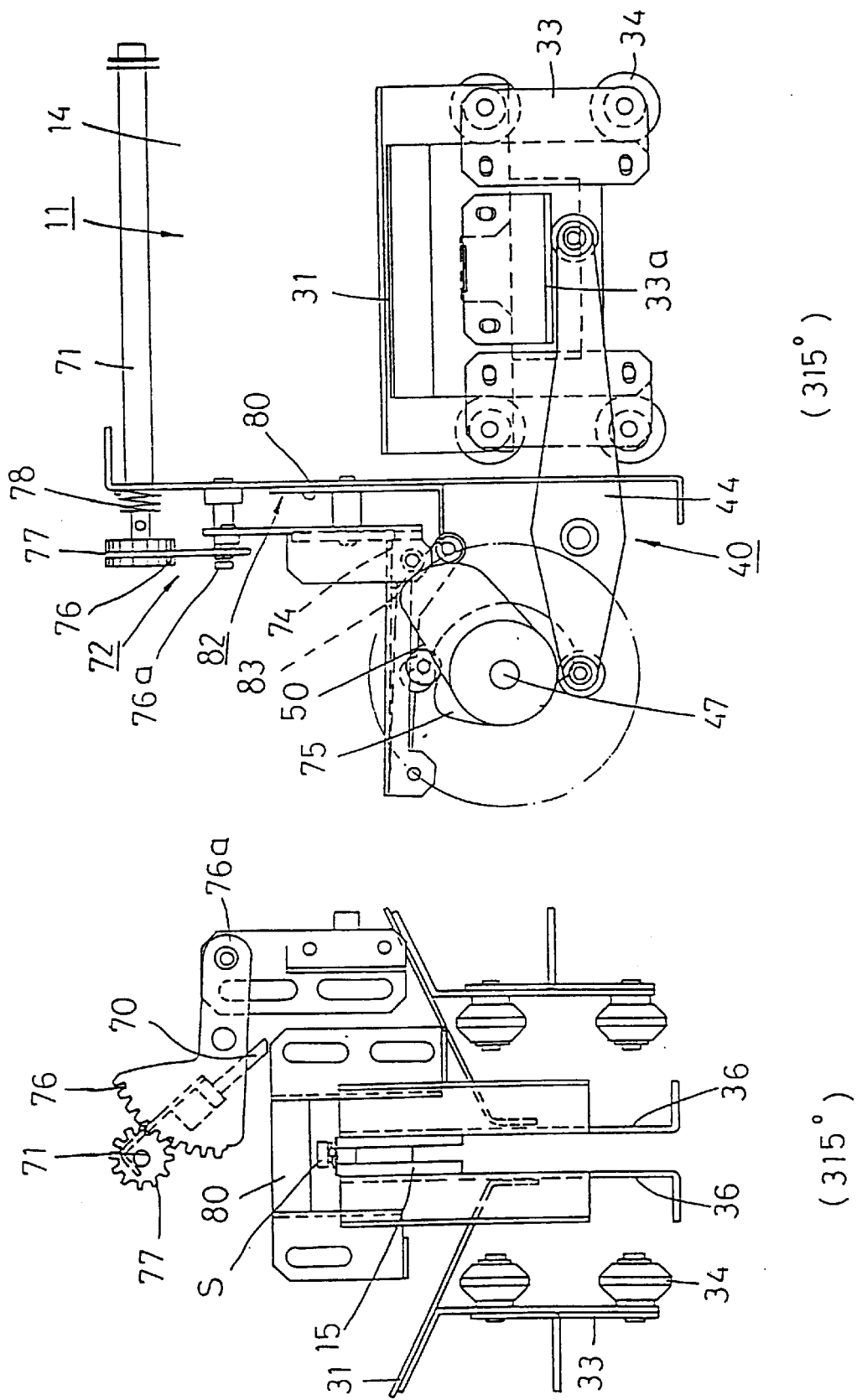
FIG.16b (315°)
FIG.16a (315°)

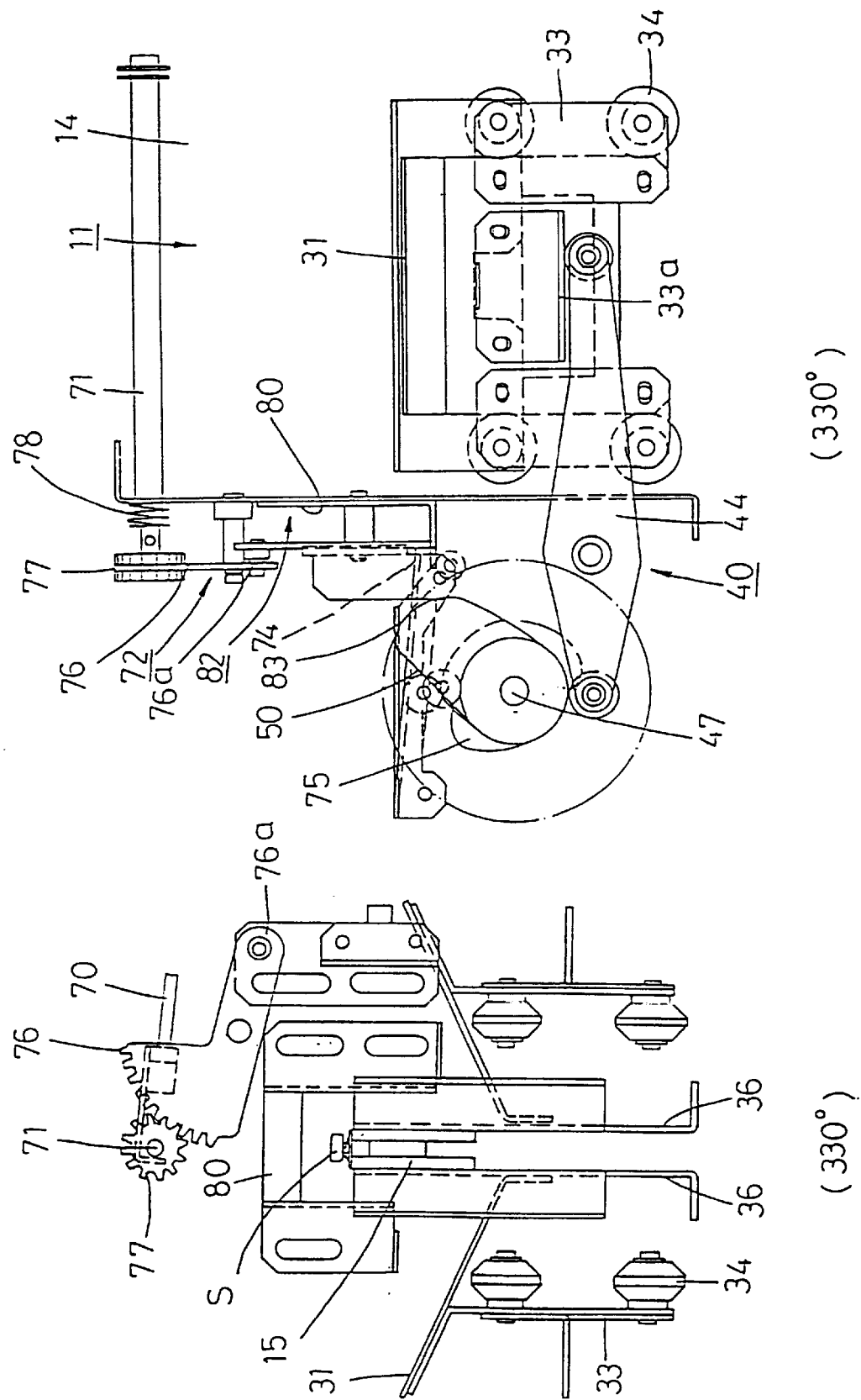

AUTOMATIC FASTENER SUPPLIER

BACKGROUND OF THE INVENTION

1. Field of the Invention

The present invention relates to automatic fastener supplier for aligning and supplying fasteners, e.g., screws, rivets, etc, and, more particularly, to a fastener supplier in which a track and associated parts thereof can be easily changed so as to be applied to fasteners of different diameters in the shanks thereof.

2. Description of the Related Art

Japanese Laid-Open Application No. 4-32183 discloses a automatic fastener supplier, which is shown in FIG. 1 and FIGS. 2a and 2b of the drawings.

The automatic fastener supplier includes a frame 1 defining a receiving section 2; an inclined track 4 for guiding fasteners S to exit the receiving section 2, wherein the inclined track 4 includes a slot 3 extending outwardly from an interior of the receiving section 2 for receiving the shanks Sa of the fasteners S via a top thereof, while the heads Sb of the fasteners S are retained above the slot 3; and a vibratile feeding plate 6 which is mounted behind the inclined track 4 and which includes a slot 5 similar to that of the inclined track 4, wherein the slot 5 is connected to the slot 3 of the inclined track 4 at an upper end thereof.

The feeding plate 6, under vibrations of a vibration mechanism 7, lifts the fasteners S inside the receiving section 2 and makes the shanks Sa of the fasteners S (which have been inserted into the slot 5 of the feeding plate 6) slide along the slot 5 in the ejecting direction. When the fasteners S reach the connection point between the upper end of the slot 5 of the feeding plate 6 and the slot 3 of the inclined track 4, the fasteners S are transported to the slot 3 of the track 4 and thus slide downwardly and are outputted in an aligned, one-by-one manner. Under this condition, since the track 4 is inclined, the adjacent fastener heads Sb might be overlapped with one another and thus results in jamming during movements thereof as the fastener heads Sb presents a V-shaped wedge effect therebetween. Responsive to this, a constraining plate 8 is provided to prevent overlapping of the fastener heads Sb.

In addition, a stop 9 is provided to a side of a front end of the track 4 for preventing further movement of the fasteners S which have reached the front end of the track 4. Thus, the fasteners S may be removed at a guiding section 9a of the stop 9 by a head of a screw driver B.

Nevertheless, the above-mentioned automatic fastener supplier cannot be applied to fastener shanks of different diameters since the width of the slot 5 cannot be adjusted and that the track 4 cannot be replaced by the users as being fixedly mounted to the frame 1. Therefore, the prior art automatic fastener supplier has a limited application as it can be applied to only one size of the fasteners S. In addition, the users have to purchase different feeding devices for fasteners of different shank diameters which results in a considerable increase in the cost.

Therefore, the present invention is intended to provide an improved automatic fastener supplier which mitigates and/or obviates the above problems.

SUMMARY OF THE INVENTION

It is a primary object of the present invention to provide an automatic fastener supplier in which the track thereof can be easily changed and the stop as well as the guiding section thereof can be easily adjusted, thereby providing a compatible supplying device for fasteners of different shank diameters.

It is another object of the present invention to provide an automatic fastener supplier which has an increased accuracy in the insertion of the screws into the track thereof, thereby reliably supplying the screws.

An automatic fastener supplier in accordance with the present invention includes a frame having a receiving section for receiving fasteners of the type having a shank and a head with a diameter greater than that of the shank. A track is removably and partially mounted in the receiving section and has a rear end and a front end. The track further includes a gap defined therein for receiving the shanks of the fasteners and an upper open edge for retaining the heads of the fasteners.

A fastener feeding device is mounted in the receiving section and is vertically movable for feeding fasteners in the receiving section onto the track. A main driving device is provided for driving the fastener feeding device to move vertically. A stop means is mounted to the front end of the track for preventing further forward movement of the fastener. A track supporting device has a supporting member for supporting the track yet allowing insertion and removal of the track. A position deciding device is mounted to the supporting member for adjusting a longitudinal position of the track.

In accordance with one aspect of the invention, the fastener feeding device includes a feeding means for lifting the fasteners in the receiving section to a position higher than the track. Preferably, the feeding means includes a pair of feeding plates respectively mounted to two lateral sides of the track.

In accordance with another aspect of the invention, a fastener actuating device driven by the main driving device is provided for actuating the supporting member and the track to move reciprocatingly along a longitudinal direction thereof, thereby imparting a force to the fasteners on the track so as to urge the fasteners to move toward the front end of the track.

In accordance with a further aspect of the invention, the supporting member includes a rear end and a front end, and further comprises a first link having a first end pivotally connected to the frame and a second end pivotally connected to the rear end of the supporting member and at least a second link having a first end pivotally connected to the frame and a second end pivotally connected to the front end of the supporting member.

In accordance with still another aspect of the invention, the position deciding device comprises a pair of wings respectively extending along two lateral sides of the track and each having a notch defined in an end thereof. A fastening element extends through each of the notches and has a screw hole defined therein. A screw extends through each of the screw holes of the fastening elements for securing the wings in position.

In accordance with yet another aspect of the invention, the frame further includes at least one vertical guiding groove defined in a wall thereof, and the feeding means further includes a plurality of rollers mounted to an outer side thereof, the rollers rolling in said at least one vertical guiding groove.

In accordance with still another aspect of the invention, the main driving device includes a driving motor, a lever having a first end attached to an underside of the feeding device and a second end, and a lever actuating means driven by the driving motor and being attached to the second end of the lever for intermittently lowering the second end of the lever, thereby intermittently lifting the feeding device.

In accordance with yet another aspect of the invention, the fastener actuating device includes a cam follower mounted to the supporting member and a disc cam which meshes with the cam follower, and a spring having a first end attached to the supporting member and a second end attached to the frame for returning the supporting member. The disc cam has a plurality of lobes defined in a periphery thereof and is driven by the main driving device so as to make the supporting member and the track to reciprocate along the longitudinal direction of the track.

In accordance with still another aspect of the invention, a brush is pivotally mounted above the track for sweeping off the fasteners which are on the track yet the shanks thereof are not received in the gap, and a brush actuating device is provided for actuating the brush to pivot. Preferably, the brush is adjustable in a length thereof.

In accordance with yet another aspect of the invention, the frame includes a front wall and a rear wall, the front wall defining a passage through which the track extends. A gate is mounted above the passage for closing and opening the passage. A gate actuating device is driven by the main driving device for lifting and lowering the gate. The gate actuating device moves synchronously with the lever actuating means, wherein the gate is in a closed status during movements of the feeding device and is in an open status when the feeding device is not moved.

In accordance with still another aspect of the invention, the stop means includes a first end pivotally mounted adjacent to the front end of the track and a second end having a stop formed thereon. The stop is initially located on a travel path of the fastener near the front end of the track and is moved away from the travel path during removal of the fastener stopped by the stop. A spring is provided for returning the stop to the travel path of the fastener.

In accordance with yet another aspect of the invention, the cam follower disengages from the disc cam during removal of the fastener stopped by the stop means.

In accordance with still another aspect of the invention, the feeding device does not move for a period of time during operation of the fastener actuating device.

In accordance with yet another aspect of the invention, the brush does not move for a period of time during operation of the fastener actuating device.

In accordance with still another aspect of the invention, a fastener detector is provided for detecting whether a fastener is stopped by the stop means, wherein the main driving device is stopped when there is a fastener stopped by the stop means, and the main driving device is activated when there is no fastener stopped by the stop means.

Other objects, advantages, and novel features of the invention will become more apparent from the following detailed description when taken in conjunction with the accompanying drawings.

BRIEF DESCRIPTION OF THE DRAWINGS

FIGS. 11a and 11b are elevational views illustrating operation of the automatic fastener supplier at a reference angle of zero degree;

FIGS. 12a and 12b are elevational views illustrating operation of the automatic fastener supplier, wherein the automatic fastener supplier is at a reference angle of 140 degrees;

FIGS. 13a and 13b are elevational views illustrating operation of the automatic fastener supplier, wherein the automatic fastener supplier is at a reference angle of 180 degrees;

FIGS. 14a and 14b are elevational views illustrating operation of the automatic fastener supplier, wherein the automatic fastener supplier is at a reference angle of 240 degrees;

FIGS. 15a and 15b are elevational views illustrating operation of the automatic fastener supplier, wherein the automatic fastener supplier is at a reference angle of 290 degrees;

FIGS. 16a and 16b are elevational views illustrating operation of the automatic fastener supplier, wherein the automatic fastener supplier is at a reference angle of 315 degrees; and FIGS. 17a and 17b are elevational views illustrating operation of the automatic fastener supplier, wherein the automatic fastener supplier is at a reference angle of 330.

DESCRIPTION OF THE PREFERRED EMBODIMENT

Figure 1:
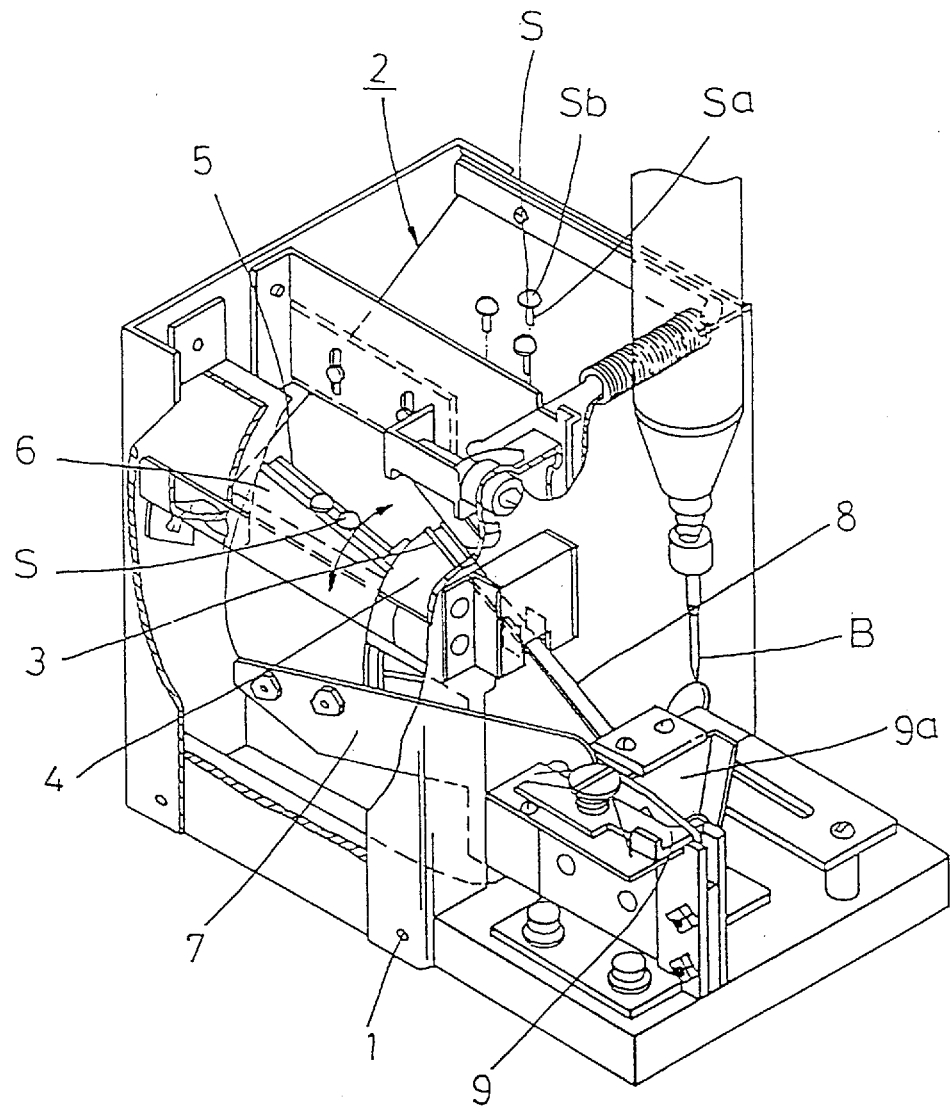
FIG. 1 is a perspective view, partly cut away, of an automatic fastener supplier according to prior art.
Figure 2A:
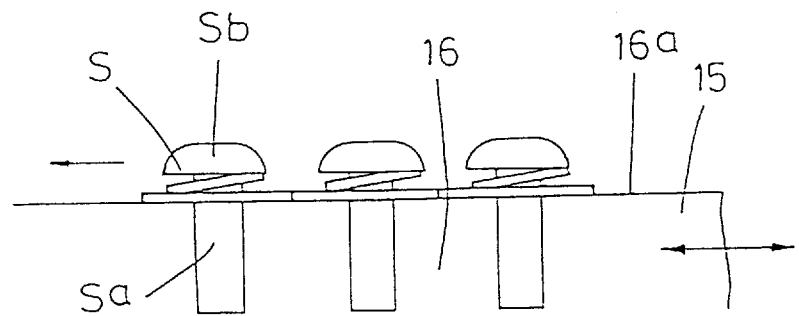
FIG. 2a is a schematic view illustrating improper status of one type of fasteners during movements thereof in the track of the prior art automatic fastener supplier.
Figure 2B:
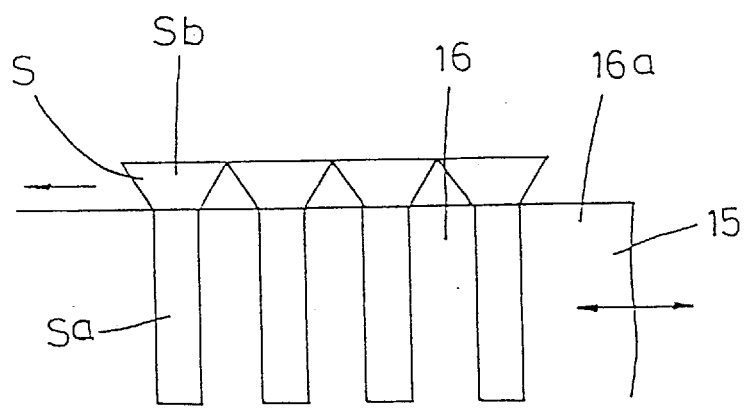
FIG. 2b is a schematic view illustrating improper status of another type of fasteners during movements thereof in the track of the prior art automatic fastener supplier.

FIGS. 3 to 10 of the drawings illustrate an automatic fastener supplier in accordance with the present invention for receiving fasteners S (e.g., screws, rivets, etc) of the type having a shank Sa and a head Sb with a diameter greater than that of the shank Sa, and for outputting aligned fasteners one by one. It is appreciated that the fasteners S also include screws of the type having a spring or washer attached thereto (see FIG. 2a). Similar to the prior art automatic fastener supplier illustrated in FIGS. 1, 2a and 2b, the automatic fastener supplier of the present invention includes a frame 10, a track 15, a track supporting device 20, a position deciding device 23, a fastener feeding device 30, a feeding plate supporting device 32, a main driving device 40, a fastener actuating device 60, a brush 70, a brush actuating device 72, a gate 80, a gate actuating device 82, a stop means 90, a guiding section 95, and a fastener detector 100.

The frame 10 includes a receiving section 11 for receiving fasteners S therein. The receiving section 11 is defined by a front wall 12a, a rear wall 12b, and two lateral walls 13 of the frame 10. A pair of feeding plates 31 are mounted in the receiving section 11. The feeding plates 31 together with the front and rear walls 12a and 12b and the lateral walls 13 define a receiving compartment 14 for receiving the fasteners S therein.

Figure 3:
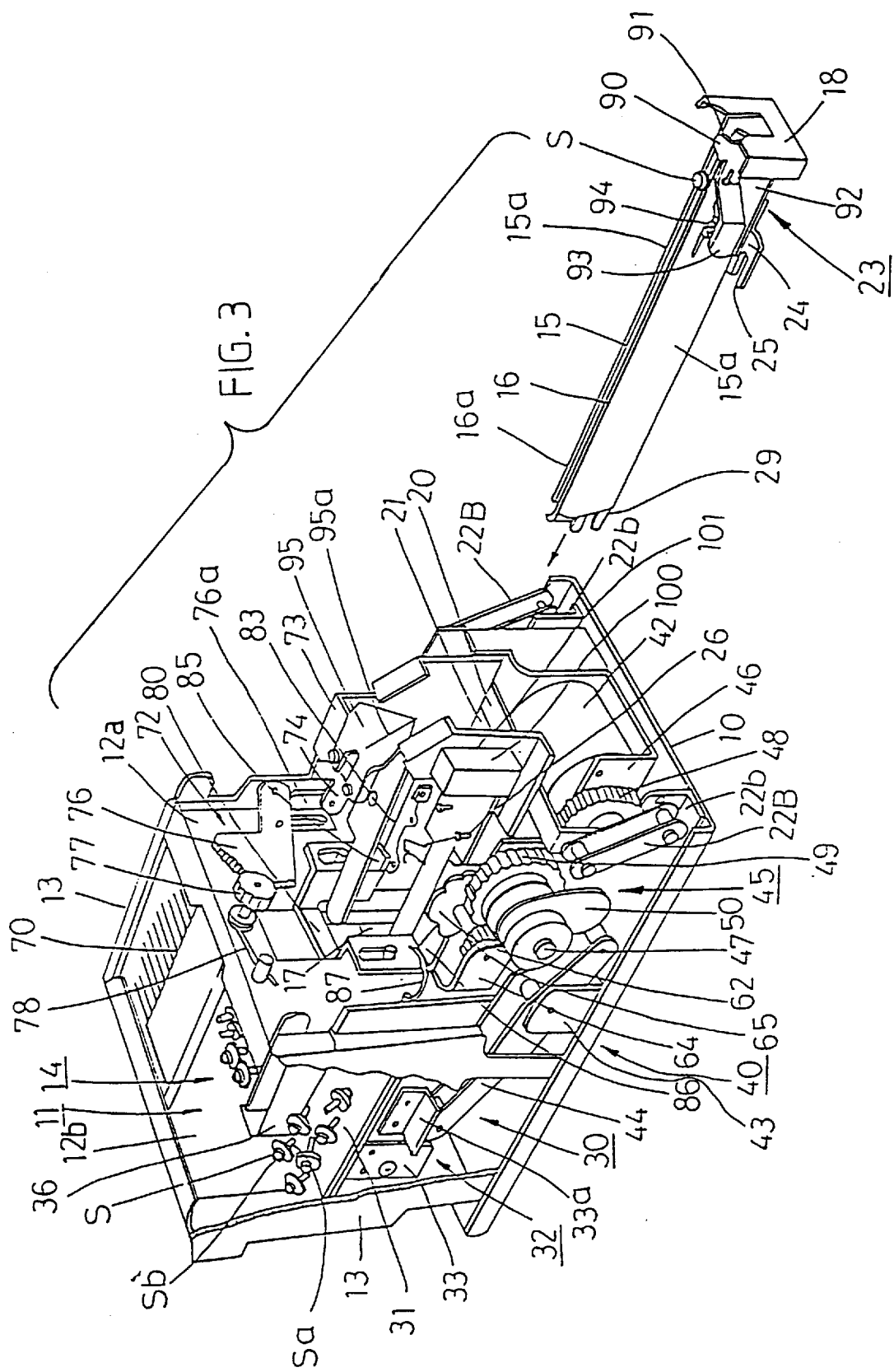
FIG. 3 is an exploded perspective view, partly cut away, of an automatic fastener supplier in accordance with the present invention.
Figure 10:
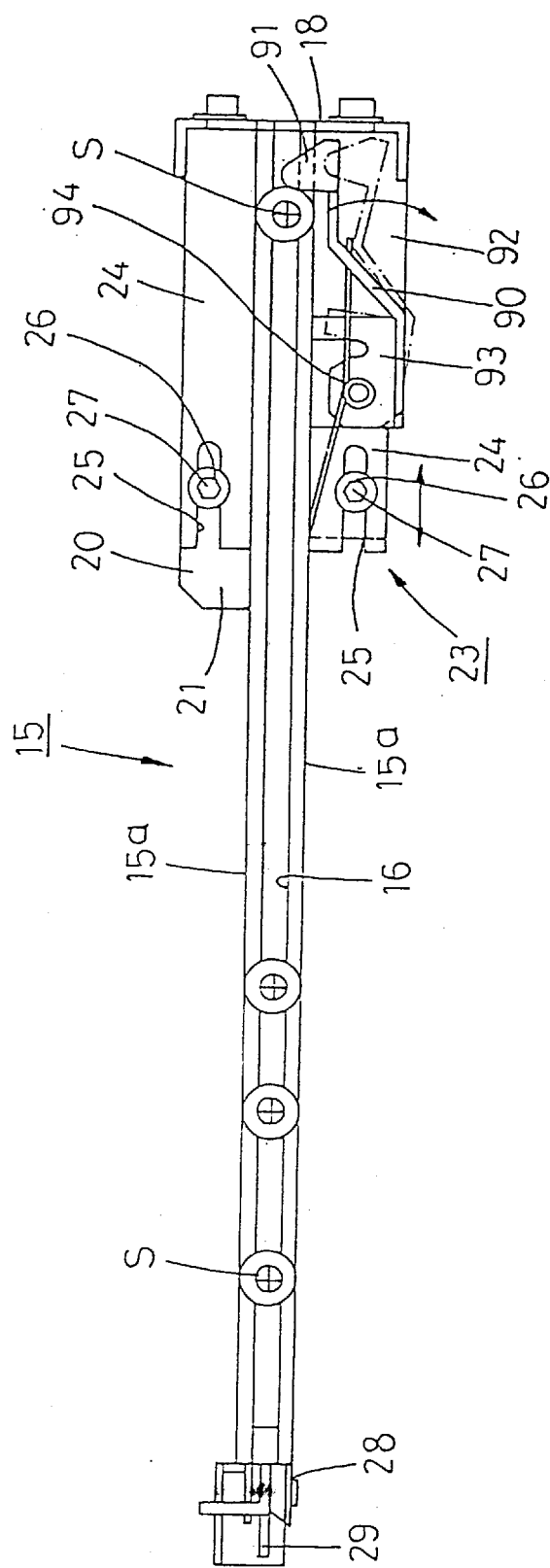
FIG. 10 is an elevational view of the track and the track supporting device of the automatic fastener supplier in accordance with the present invention.

The track 15 is removably and partially mounted in the receiving section 11. As shown in FIGS. 3 and 10, the track 15 includes a pair of rectangular plates 15a which have a gap 16 defined therebetween. The gap 16 is of a pre-determined width for accommodating shanks Sa of the fasteners S via a top thereof. Upper ends of the rectangular plates 15a are folded inwardly toward each other, thereby defining an open edge 16a at a top of the gap 16 for supporting a head Sb of the fastener S to be ejected outside from an interior of the receiving section 11. A passage 17 is defined in the front inner wall 12 of the receiving section 11, thereby allowing ejection of the fasteners S moving along the track 15 whichextends through the passage 17. A front cover 18 (see FIG. 4) is mounted in front of the track 15, and the gap 16 of the track 15 may be of different widths so as to be applied to fasteners of different shank diameters.

Figure 7:
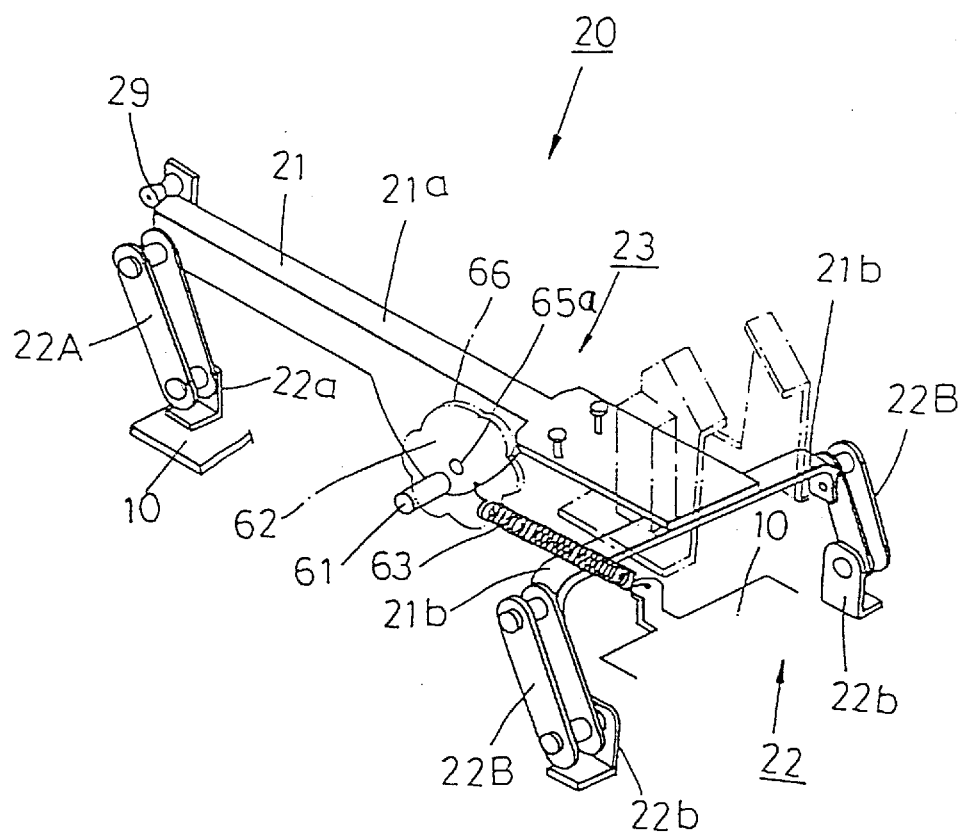
FIG. 7 is a perspective view illustrating a track supporting device of the automatic fastener supplier in accordance with the present invention.

The track 15 is supported by a supporting device 20 in a slightly inclined manner. The supporting device 20 is reciprocatingly movable along a longitudinal direction thereof. As shown in FIG. 7, the track supporting device 20 includes a supporting member 21 with a supporting face 21a which supports the track 15 and allows the track 15 to be partially inserted into or removed from the receiving section 11. The supporting member 21 has a rear end extending through the rear wall 12b of the frame 10 and a U-shaped front end extending through the front wall 12a of the frame 10. The U-shaped front end includes two distal ends 21b.

The supporting device 20 further includes a supporting means 22 which includes a first fixing plate 22a and two second fixing plates 22b. The first fixing plate 22a has a first end pivotally connected to a rear end of the supporting member 21 via a first link 22A and a second end fixed to the frame 10, i.e., the rear end of the supporting member 21 is pivotally mounted to the frame 10. Each second fixing plate 22b has a first end pivotally connected to an associated distal end 21b via a second link 22B and a second end fixed to the frame 10, i.e., the front end of the supporting member 21 is pivotally connected to the frame 10.

The position deciding device 23 is mounted to the supporting member 21 of the supporting device 20 for adjusting a longitudinal position of the track 15. As shown in FIG. 10, the position deciding device 23 includes a lower end mounted to the front end of the track 15, and a pair of wings 24 respectively extending outwardly from two lateral sides thereof. The wings 24 extends along the longitudinal direction of the track 15 and has a notch 25 defined in a rear end thereof. A fastening element 26 with a screw hole (not shown) is inserted through the notch 25 and secured adjacent to the front end of the supporting member 21. A position deciding screw 27 is inserted through the fastening element 26 so as to mount an associated wing 24 to the supporting member 21 when the track is at a proper position. The position deciding screw 27 may be tightened or loosened by means of a hexagonal wrench.

Figure 4:
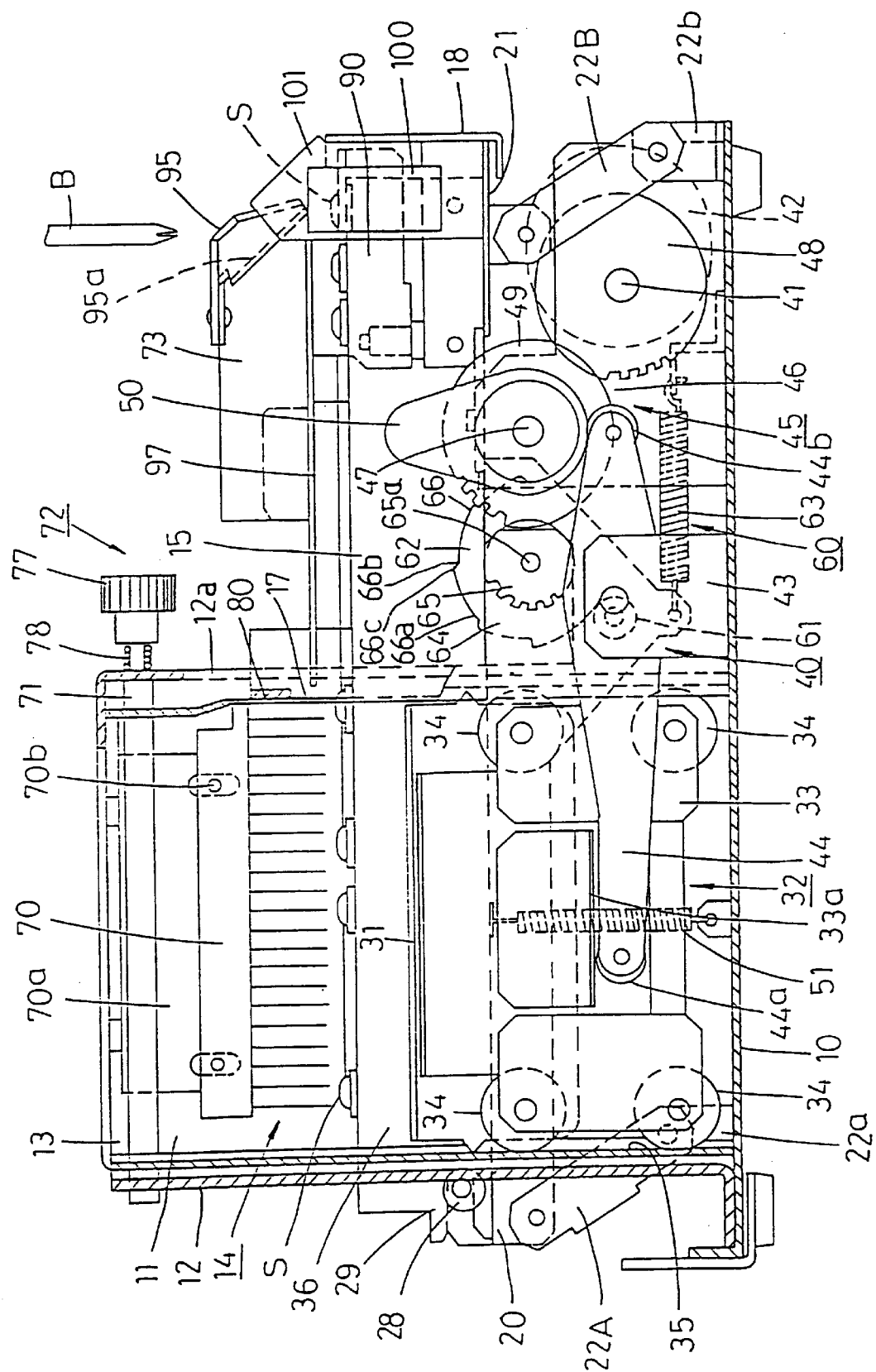
FIG. 4 is a side elevational view, partly sectioned, of the automatic fastener supplier in accordance with the present invention.
Figure 5:
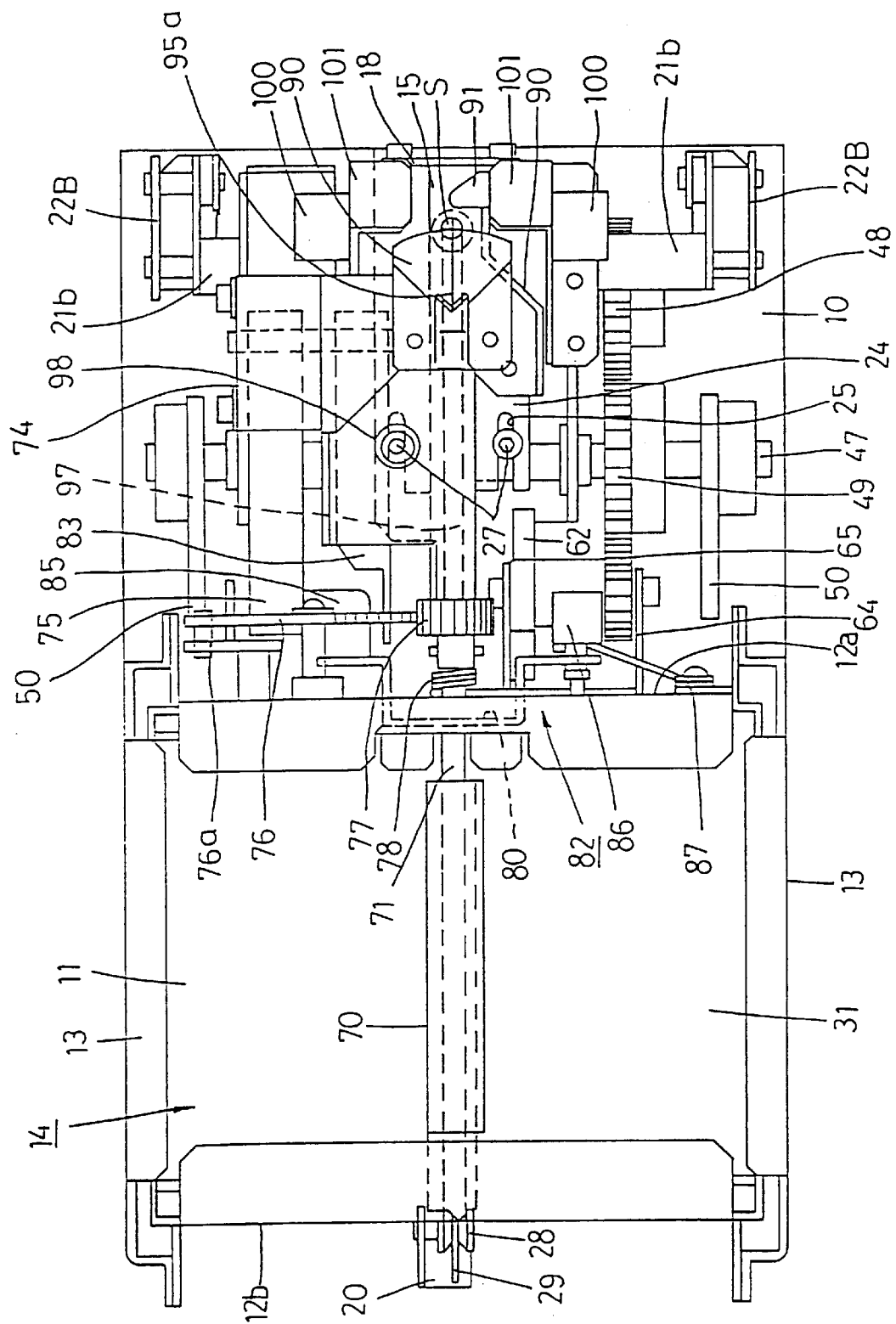
FIG. 5 is a top plan view of the automatic fastener supplier in accordance with the present invention.

Referring to FIGS. 4, 5, and 10, a guiding roller 28 is mounted to the rear end of the supporting member 21 and has an axis extending in a direction perpendicular to the longitudinal direction of the track 15. A restraining member 29 is mounted to the rear end of the track 15. When the track 15 is inserted into the receiving section 11, the guiding roller 28 is held between a U-shaped end of the restraining member 29, thereby restraining vertical movements of the track 15. In addition, the wings 24, the notches 25, and the restraining member 29 may be applied to tracks 15 of different widths.

As shown in FIGS. 3, 11, and 17, the fastener feeding device 30 is mounted adjacent to a lateral side of the track 15 and is movable in the vertical direction. When the feeding device 30 moves upwardly, the fastener S in the receiving section 11 is lifted to a position higher than the track 15. The feeding device 30 includes a pair of feeding plates 31 respectively mounted adjacent to the two lateral sides of the track 15 for lifting the fasteners S to a position higher than the opening edge 16a of the track 15. The feeding plate supporting device 32 supports the feeding plates 31 yet allows the feeding plates 31 to move in a vertical direction. The main driving device 40 actuates the feeding plates 31 to move vertically. The feeding plates 31 are respectively mounted adjacent to the two lateral sides of the track 15 and inclines toward the track 15.

Figure 8:
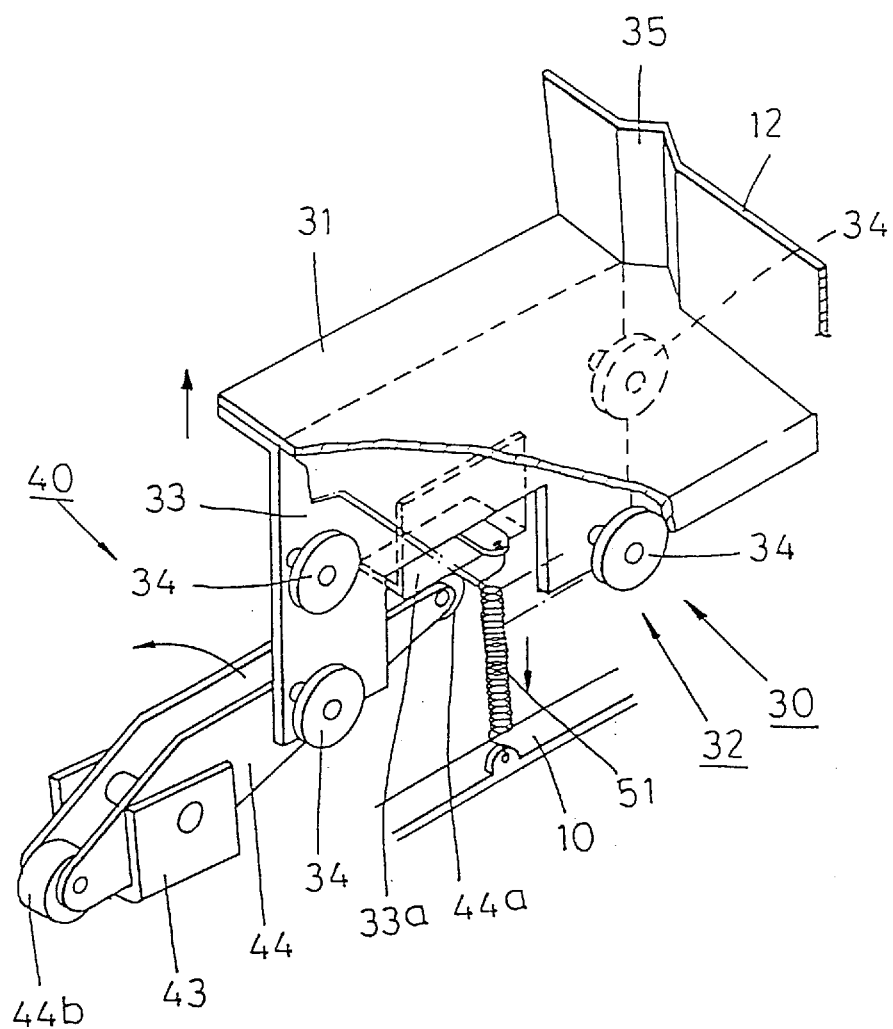
FIG. 8 is a perspective view illustrating a feeding plate supporting device of the automatic fastener supplier in accordance with the present invention.
Figure 9:
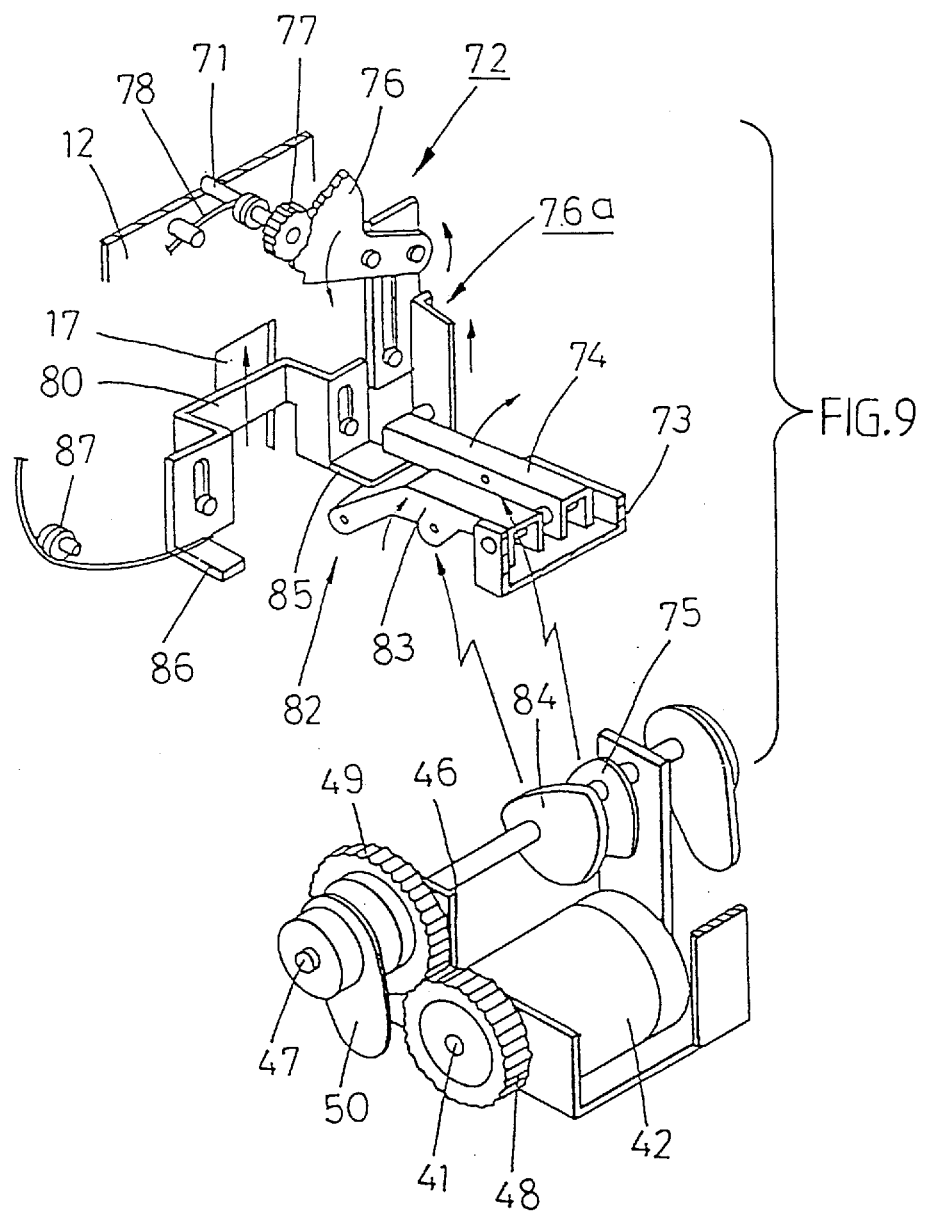
FIG. 9 is a perspective view illustrating a brush actuating device and a main driving device of the automatic fastener supplier in accordance with the present invention.

As shown in FIGS. 4 and 8, the feeding plate supporting device 32 includes a plurality of rollers 34 (in this embodiment, there are four rollers 34) respectively mounted to an extension plate 33 which extends downwardly from each feeding plate 31. The supporting device 32 further includes a vertical guiding groove 35 defined in each of the front and rear inner walls 12 of the receiving section 11 for guiding the rollers 34 to roll along the vertical direction.

As shown in FIGS. 3, 4, 8, 9, 11, and 17, the main driving device 40 includes a driving motor 42, a pair of levers 44, and a lever actuating means 45. The driving motor 42 is mounted to a front side of the frame 10 and includes a driving axle 41 extending in a direction perpendicular to the track 15. Referring to FIGS. 3 and 4, each lever 44 is pivotally mounted to a frame 10 at a mediate portion thereof by a member 43 and includes a first roller 44a mounted to a first end thereof and a second roller 44b mounted to a second end thereof. In addition, the first roller 44a of each lever 44 is attached to a bracket 33a fixed to a mediate portion of the extension plate 33 for intermittently lifting the associated feeding plate 31.

Referring to FIGS. 3, 4, 5, and 9, the lever actuating means 45 includes a driven shaft 47 which is rotatably mounted to the frame 10 via a U-shaped member 46 and which is parallel to the driving axle 41 of the driving motor 42, a driving gear 48 mounted to the driving axle 41 of the driving motor 42 to rotate therewith, a driven gear 49 which is mounted to the driven shaft 47 to rotate therewith and which meshes with the driving gear 48, and a pair of cams 50. The cams 50 are respectively mounted to two ends of the driven shaft 47 for respectively, intermittently lowering the second rollers 44b on the second ends of the associated levers 44, so as to pivot the levers 44, thereby lifting/lowering the feeding plates 31. Both cams 50 have the same phase position, and the feeding plates 31 are, therefore, lifted or lowered simultaneously. A spring 51 is mounted between a lower portion of each of the feeding plates 31 and the frame 10 for returning (i.e., lowering) the first ends (see 44a) of the levers 44 to the lowered positions as the spring 51 is extended when the first ends of the levers 44 are lifted.

The fastener actuating device 60 makes the track 15 move back and forth and thus imparts a force to the fasteners S in the slot 16 of the track 15 so as to move toward the ejection direction. As shown in FIGS. 4 and 7, the actuating device 60 includes a cam follower 61 mounted to a lower portion of the supporting member 21 of the track supporting device 20 so as to move with the track 15, a disc cam 62 which has a plurality of lobes at a peripheral cam surface thereof and which is mounted to the cam follower 61, and a spring 63 having a first end attached to the frame 10 and a second end attached to the supporting member 21 for returning the supporting member 21 as well as the track 15. The disc cam 62 is mounted to a mounting seat 64 provided to the front inner wall 12a by a shaft 65a for engaging with the cam follower 61. Rotation of the driving axle 41 makes a transmission gear 65 on the shaft 65a to turn via transmission of the driving gear 48 and the driven gear 49 and therefore drives the disc cam 62 to turn.

As shown in FIG. 4, the cam surface 66 of the disc cam 62 includes a plurality of slowly inclined sections 66a and rapidly inclined sections 66b each respectively declined from an associated slowly inclined section 66a to form a drop 66c, thereby forming the lobes 67 (in this embodiment, there are twelve lobes). Thus, when the cam follower 61 moves from one of the lobe 67 to the adjacent drop 66c, the track 15 is moved rapidly and forwardly via transmission of the supporting member 21, thereby imparting the fasteners S with a force to move toward the ejection direction. The spring 63 returns the track 15 to its initial position, thereby allowing rapid back and forth movements of the track 15.

In this embodiment, the gear ratio between the driving gear 48 and the driven gear 49 is 1:1, and the gear ratio between the driven gear 49 and the transmission gear 65 is 2:1. Thus, when the driving axle 41 rotates a turn, the track 15 supported by the supporting member 21 moves back and forth for 24 times.

Referring to FIGS. 3 to 6 and 9, the brush 70 is mounted above the track 15 for sweeping off the fasteners S not received in the gap 16 of the tracks 15. Two screws 70b (see FIG. 4) are used to fix the brush 70 to a bracket 70a after the brush 70 is adjusted to have a proper length for sweeping. A pivotal axle 71 is pivotally mounted between the two inner walls 12, and the bracket 70a is mounted to the pivotal axle 71 to move therewith, thereby allowing pivotal movements of the brush 70 as the brush 70 is fixed to the bracket 70a to move therewith.

Figure 6:
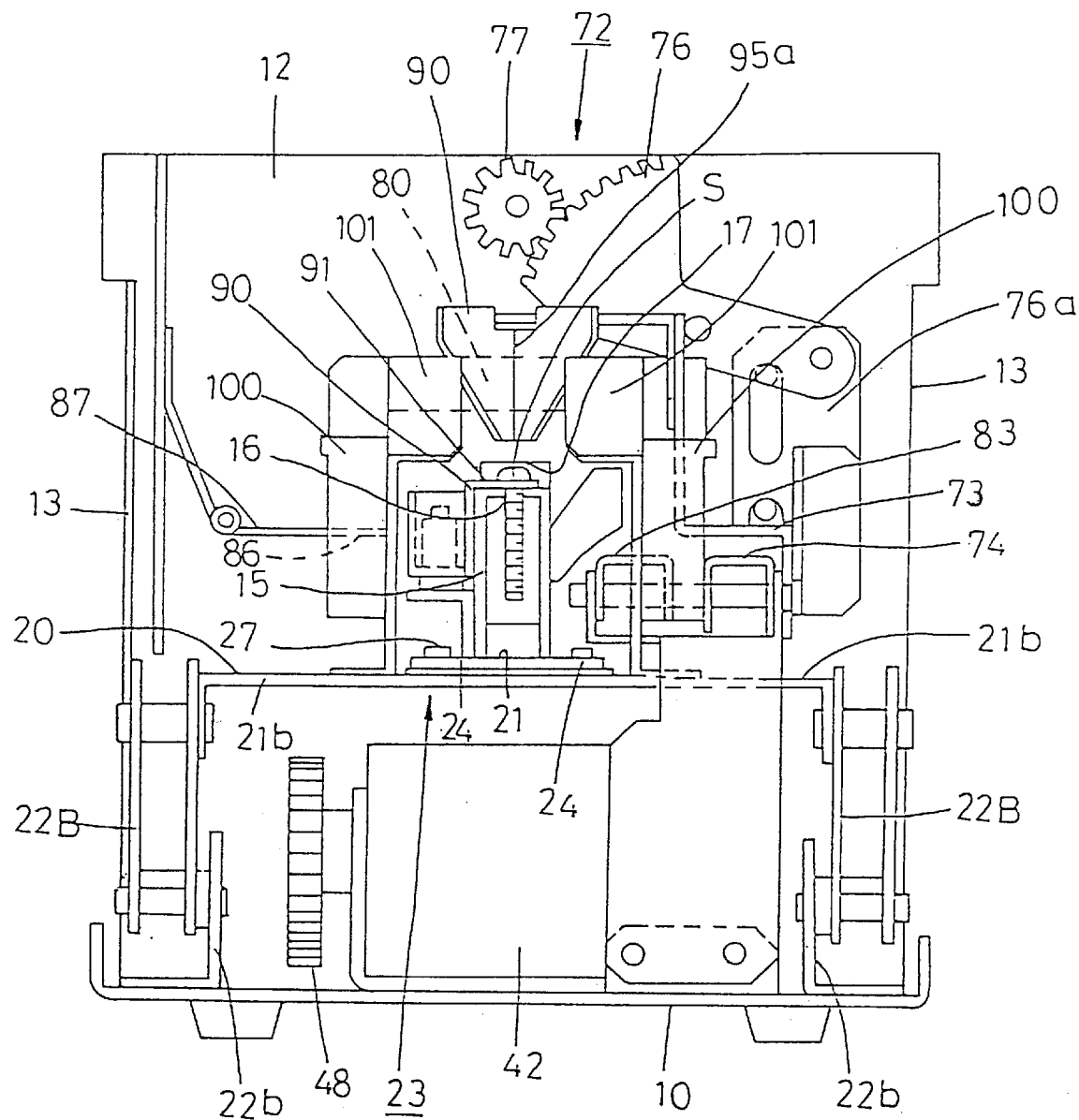
FIG. 6 is a front elevational view of the automatic fastener supplier in accordance with the present invention.

The brush driving device 72, as shown in FIGS. 3, 5, 9, 11, and 17, includes a pivotal rod 74, a cam 75 which is rotatably mounted on the driven shaft 47 to rotate therewith for intermittently lifting the pivotal rod 74 via a tappet member 76a, a rocker arm 76, and a pinion 77. The pivotal rod 74 includes a first end pivotally mounted to a mounting member 73 which is mounted to the frame 10 adjacent to the supporting member 21 and a second end attached to a lower end of the tappet member 76a which is mounted adjacent to the front wall 12a and which is vertically movable. Referring to FIG. 6, the rocker arm 76 includes a first end attached to an upper end of the tappet member 76a to move therewith and a second end having a gear quadrant formed thereon for meshing with the pinion 77 rotatably mounted on the pivotal axle 71 for the brush 70, thereby causing the pinion 77, the pivotal axle 71, as well as the brush 70 to pivot through an angle for sweeping purpose. A spring 78 is mounted around the pivotal axle 71 for returning the pinion 77 to its initial position.

Referring to FIGS. 3 and 4, the gate 80 is mounted adjacent to the front wall 12a. The gate 80, when in an open position, allows the fasteners S to pass through the passage 17, and, when in a closed position, prohibits passage of the fasteners S. The gate 10 is in a closed status during movements of the feeding plates 31 and is in an open status when the feeding plates 31 are not moved.

Referring to FIGS. 3, 5, 9, 11, and 17, the gate actuating device 82 includes a cam 84 mounted on the driven shaft 47 to rotate therewith. The gate driving device 82 further includes an actuating rod 83 which has a first end pivotally mounted to the mounting member 73 and a second end which is attached to a plate 85 integrally formed with the gate 80. Rotation of the cam 84 intermittently lifts the second end of the actuating rod 83, thereby causing intermittent opening of the passage 17. The gate 80 falls due to gravity to close the passage 17 when the cam 84 no longer bears against a bottom side of the actuating rod 83. Alternatively, a spring 87 (see FIGS. 5 and 9) may be attached to another plate 86 integrally formed with the gate 80 to assist in lowering motion of the gate 80.

Referring to FIGS. 3 and 10, the stop means 90 includes a first end 93 pivotally mounted to a plate 92, which, in turn, is mounted adjacent to one lateral side of the track 15. A stop 91 is formed at a second end of the stop means 90 and lies on a travel path of the fasteners S on the front end of the track 15 to avoid further forward movements of the fasteners S. A user may use a screw drive head B to engage with the fastener head Sb in which the user may use the screw driver B to urge the stop 91 to leave the travel path, thereby allowing easy removal of the fastener S. In addition, a spring 94 is provided to return the stop 91 to lie on the travel path of the fasteners S.

The guiding member 95, as shown in FIGS. 3 to 6, is mounted above the track 15 and is substantially V-shaped and includes an inclined groove 95a for guiding the screw driver head B to remove the fastener S stopped by the stop 91.

A ceiling plate 97 is mounted to the mounting member 73 at a position above the track 15 and extends outside the receiving section 11 for avoiding the fasteners S to leave the gap 16 via the top of the gap 16. The reference numeral "98" in FIG. 5 represents a hole by which a spanner may operate to lock the position deciding screws 27 in position.

In addition, a fastener detector 100 is mounted adjacent to the front end of the track 15 to detect whether a fastener S is stopped by the stop 91. The fastener detector 100 may be a photodetector and may include a pair of restraining plates 101 respectively mounted at two sides of the front end of the supporting member 21 to restrain movement of the screw driver head B. When the detector 100 detects that a fastener S is stopped by the stop 91, the motor 42 stops running after a pre-determined period of time. However, when the detector 100 detects that no fastener S is stopped by the stop 91, the motor 42 starts running again.

In use, the position deciding screws 27 are loosened, and then a track 15 with a desired width suitable for fasteners of a specific shank diameter is partially inserted into the receiving section 11 in the above-mentioned manner until the U-shaped end of the restraining member 29 engages with the guiding roller 28, thereby preventing vertical movement of the track 15 yet allowing back and forth movement of the track 15. Then, the position deciding screws 27 are tightened. It is appreciated that the stop 95 is adjusted to be on the path of the fasteners S for stopping the fasteners 5.

After fasteners S are drawn into the receiving compartment 14, and the motor 42 starts to run and thus drives the driving axle 41. When the driving axle 41 rotates a turn, the main driving device 40, the fastener actuating device 60, the brush actuating device 72, and the gate actuating device 82 also complete a cycle of operation.

Referring to FIGS. 11a and 11b in which the driving axle is at a phase angle of zero degree, the cam 84 of the gate actuating device 82 lifts the actuating rod 83, thereby opening (i.e., lifting) the gate 80.

Under this status, each cam 50 of the main driving device 40 press against the second end (see 44*b*) of the associated lever 40, thereby urging the associated feeding plate 31 to move upwardly to a position higher than the track 15 (see FIG. 13*a*) where the fasteners S are swept onto the track 15 by the brush 70 with the shanks Sa being received in the gap 16 and with the heads Sb being retained above the open edge 16*a*. It is appreciated that the fasteners S may be easily located onto the track 15 as they are lifted to a position above the track 15. In addition, the fasteners S may move between the two feeding plates 31 and thus provide an increased chance for locating the fasteners S onto the track 15. The feeding plates 31 are returned to their initial positions by the springs 51 (see FIGS. 12*a* and 12*b* to 14*a* and 14*b*). Operation of the feeding plate driving device 40 can be easily adjusted as it include cams 50 for intermittent operation.

Then, as shown in FIGS. 13*a*, 13*b*, 14*a*, and 14*b*, the gate 80 closes for a period of time after the feeding plates 31 have completed one upward stroke one the downward stroke. Thus, the fasteners S will not be jammed at the passage 17 and will not "jump" off from the track 15. Meanwhile, as the gate 80 is closed, the fasteners S are not ejected via the passage 17.

When the feeding plates 31 reach their bottommost positions shown in FIGS. 14*a* and 14*b*, the brush actuating device 72 begins to operate (see FIGS. 14*a*, 14*b*, 15*a*, 15*b*, 16*a*, and 16*b*). When the cam 75 lifts the rod 74, the rocker arm 76 pivots such that the pinion 77 rotates through an angle via transmission of the gear quadrant on the second end of the rocker arm 76. Thus, the brush 70 pivots through an angle (for sweeping off the fasteners S not received in the gap 16 of the track 15) as the axle 71 is driven.

When the brush 70 is returned to its initial position by the spring 78 (see FIGS. 16*a* and 16*b*), the cam 84 of the gate driving device 80 lifts the rod 83 and thus lifts the gate 80 (see FIGS. 17*a* and 17*b*). The fastener actuating device 60 is still running and thus may urge the fasteners S to pass through the passage 17.

When the cam 61 falls from one of the lobes 67 via the drop 66*c*, the track 15 moves rapidly forwardly due to provision of the spring 63, thereby imparting a forward force to the fasteners S. In this embodiment, the track 15 moves back and forth for 24 times during each turn of the driving axle 41. Thus, the fasteners S on the track 15 slowly passes through the passage 17. Preferably, the track 15 may be slightly inclined to assist in forward movements of the fasteners S. In addition, the supporting member 21 is supported by the first and second links 22A and 22B, and the track 15 is driven by the cam follower 61 via transmission of the disc cam 62, the fasteners S are imparted with the required forward force in a reliable manner. This is advantageous in preventing from overlapping of the fasteners S which conventionally fall onto the inclined track 15 (see FIG. 2) as V-shaped wedge effect will not occur.

In addition, during continuous operation of the actuating device 60, the feeding plates 31 are not moved for a period of time (see FIGS. 11*a*, 11*b*, 14*a*, 14*b*, 15*a*, 15*b*, 16*a*, 16*b*, 17*a*, and 17*b* wherein the phase angle of the driving axle 41 is between zero degree and 140 degrees and between 240 degrees and zero degree), and the brush 70 is not moved for a period of time (see FIGS. 11*a*, 11*b*, 12*a*, 12*b*, 13*a*, 13*b*, 14*a*, 14*b*, 17*a*, and 17*b* wherein the phase angle of the driving axle 41 is between zero degree and 240 degrees and between 330 degrees and zero degree). Thus, there is a period of time for not placing the fasteners S onto the track and there is no time for the brush 70 to sweep off the fasteners S received in the gap 16 of the track 15.

The fasteners S on the track 15 is stopped by the stop 91 after passing through the passage 17. The user may use a screw driver head B to engage with the fastener head Sb (under the guidance of the guiding groove 95*a*) to remove the fastener S. The cam follower 61 disengages from the disc cam 62 during removal of the fastener S stopped by the stop 91.

When the detector 100 detects that a fastener is stopped by the stop 91, the motor 42 is stopped. This is advantageous in saving electricity in case that when a worker leaves the automatic supplier or the fastener is not removed after a pre-determined period of time has expired. When the detector 100 detects there is no fastener stopped by the stop 91, the motor 42 is activated again.

For fasteners having different shank diameters, the only thing the user has to do is to use a new track with the desired width.

According to the above description, it is appreciated that the present invention has the following advantages:

(1) the track 15 can be easily inserted into or removed from the automatic fastener supplier for replacement, thereby providing a wider application;

(2) the stop 91 can be adjusted to the desired longitudinal position in response to a change in the track 15, which also may prevent from adverse effect to the screw driver head during pressing against the fastener head;

(3) the fasteners S are lifted by the feeding plates to a position higher than the track 15 and thus can be turned over so as to be received in the track 15 in an easier manner, thereby providing an increased chance for placing the fasteners S onto the track 15;

(4) the feeding plates 31 allow the fasteners S to move therebetween, which further increase the chance for placing the fasteners S onto the track 15;

(5) the track 15 may move back and forth along a longitudinal direction and thus impart a forward force to the fasteners thereon, which is better than the conventional design (in which the fasteners fall due to gravity) and which prevents overlapping between the fasteners;

(6) the track supporting device is simple in structure, the position deciding device is easily positioned by means of screws extending through the wings, and the feeding plates are guided by rollers to move in the vertical direction such that the fasteners will not stuck in the gaps between the feeding plates and the receiving section;

(7) the feeding plates are driven by levers, which, in turn, are driven by cams, and thus can be easily adjusted in the timing thereof, while the actuating device are driven by the cam follower engaging with the disc cam, which is simple in structure and may reliably provide the required forward force to the fasteners;

(8) the brush 70 is mounted above the track 15 and thus may sweep off the fasteners which are not properly located in the gap 16 of the track such that the fasteners properly located in the gap 16 of the track 15 may move without obstacle, in addition, the brush 70 is adjustable in the length thereof in response to the height of the fastener head to be supplied;

(9) the gate 80 may close the passage 17 when the fasteners have been lifted by the feeding plates and may open the passage 17 when the fasteners are not lifted, thereby preventing the fasteners from leaving the track or being jammed at the passage 17;

(10) when the fastener is removed by the screw driver head, the cam follower turns in a manner that no force is imparted to the track such that the track does not vibrate, thereby preventing a loss of removal of the fastener;

(11) the detector may detect whether a fastener is stopped by the stop to save electricity;

(12) the feeding plates do not move for a period of time during operation of the fastener actuating device 60 such that there is a period of time for not placing fasteners onto the track, thereby eliminating the factor of hindering movements of the fasteners; and

(13) the brush does not move for a period of time during operation of the fastener actuating device 60 such that the track already received in the gap 16 of the track 15 will not be swept off and that the fasteners on the track 15 may move forwardly.

Although the invention has been explained in relation to its preferred embodiment, it is to be understood that many other possible modifications and variations can be made without departing from the spirit and scope of the invention as hereinafter claimed.

What is claimed is:

1. An automatic fastener supplier, comprising:
    a frame (10) having a receiving section (11) for receiving fasteners (S) of the type having a shank (Sa) and a head (Sb) with a diameter greater than that of the shank;
    a track (15) removably and partially mounted in the receiving section and having a rear end and a front end, the track further including a gap (16) defined therein for receiving the shanks of the fasteners and an upper open edge (16a) for retaining the heads of the fasteners;
    a fastener feeding device (30) mounted in the receiving section, the feeding device being vertically movable for feeding fasteners in the receiving section onto the track;
    a main driving device (40) for driving the fastener feeding device to move vertically;
    a stop means (90) mounted to the front end of the track for preventing further forward movement of the fastener;
    a track supporting device (20) having a supporting member (21) for supporting the track yet allowing insertion and removal of the track; and
    a position deciding device (23) mounted to the supporting member for adjusting a longitudinal position of the track.

2. The automatic fastener supplier according to claim 1, wherein the fastener feeding device (30) includes a feeding means for lifting the fasteners in the receiving section to a position higher than the track.

3. The automatic fastener supplier according to claim 2, wherein the feeding means includes a pair of feeding plates (31) respectively mounted to two lateral sides of the track.

4. The automatic fastener supplier according to claim 2, wherein the frame (10) further includes at least one vertical guiding groove (35) defined in a wall thereof, and the feeding means further includes a plurality of rollers (34) mounted to an outer side thereof, the rollers rolling in said at least one vertical guiding groove.

5. The automatic fastener supplier according to claim 1, wherein the supporting member includes a rear end and a front end, and further comprises a first link (22A) having a first end pivotally connected to the frame and a second end pivotally connected to the rear end of the supporting member and at least a second link (22B) having a first end pivotally connected to the frame and a second end pivotally connected to the front end of the supporting member.

6. The automatic fastener supplier according to claim 1, wherein the position deciding device (23) comprises:
    a pair of wings (24) respectively extending along two lateral sides of the track and each having a notch (25) defined in an end thereof,
    a fastening element (26) extending through each of the notches and having a screw hole defined therein, and
    a screw (27) extending through each of the screw holes of the fastening elements for securing the wings in position.

7. The automatic fastener supplier according to claim 1, wherein the main driving device (40) includes a driving motor (42), a lever (44) having a first end attached to an underside of the feeding device and a second end, and a lever actuating means (45) driven by the driving motor and being attached to the second end of the lever for intermittently lowering the second end of the lever, thereby intermittently lifting the feeding device.

8. The automatic fastener supplier according to claim 7, wherein the frame (10) includes a front wall (12a) and a rear wall (12b), the front wall defining a passage (17) through which the track extends, and further comprising:
    a gate (80) mounted above the passage (17) for closing and opening the passage, and
    a gate actuating device (82) which is driven by the main driving device for lifting and lowering the gate (80) and which moves synchronously with the lever actuating means (40), wherein the gate is in a closed status during movements of the feeding device and is in an open status when the feeding device is not moved.

9. The automatic fastener supplier according to claim 1, wherein the stop means (90) includes a first end (93) pivotally mounted adjacent to the front end of the track and a second end having a stop (91) formed thereon, the stop being initially located on a travel path of the fastener near the front end of the track and being moved away from the travel path during removal of the fastener stopped by the stop, and a spring for returning the stop to the travel path of the fastener.

10. The automatic fastener supplier according to claim 1, further comprising a fastener detector (100) for detecting whether a fastener is stopped by the stop means, wherein the main driving device (40) is stopped when there is a fastener stopped by the stop means, and the main driving device is activated when there is no fastener stopped by the stop means.

11. The automatic fastener supplier according to claim 1, further comprising a fastener actuating device (60) driven by the main driving device for actuating the supporting member and the track to move reciprocatingly along a longitudinal direction thereof, thereby imparting a force to the fasteners on the track so as to urge the fasteners to move toward the front end of the track.

12. The automatic fastener supplier according to claim 11, wherein the fastener actuating device (60) includes a cam follower (61) mounted to the supporting member (21) and a disc cam (62) which meshes with the cam follower, and a spring (63) having a first end attached to the supporting member and a second end attached to the frame for returning the supporting member, and wherein the disc cam (62) has a plurality of lobes (67) defined in a periphery thereof and is driven by the main driving device so as to make the supporting member and the track to reciprocate along the longitudinal direction of the track.

13. The automatic fastener supplier according to claim 12, wherein the cam follower (61) disengages from the disc cam (62) during removal of the fastener stopped by the stop means.

14. The automatic fastener supplier according to claim 12, wherein the feeding device does not move for a period of time during operation of the fastener actuating device.

15. The automatic fastener supplier according to claim 1, further comprising:

a brush (70) pivotally mounted above the track for sweeping off the fasteners which are on the track yet the shanks thereof are not received in the gap (16); and a brush actuating device (72) for actuating the brush to pivot.

16. The automatic fastener supplier according to claim 15, wherein the brush does not move for a period of time during operation of the fastener actuating device.

17. The automatic fastener supplier according to claim 15, wherein the brush (70) is adjustable in a length thereof.

* * * * *